(12) United States Patent
Zhang et al.

(10) Patent No.: US 11,428,625 B2
(45) Date of Patent: Aug. 30, 2022

(54) DEVICE FOR MEASURING FRICTION COEFFICIENT UNDER THE CONDITION OF MATERIAL PERIODIC DEFORMATION

(71) Applicant: BEIJING UNIVERSITY OF TECHNOLOGY, Beijing (CN)

(72) Inventors: Caixia Zhang, Beijing (CN); Caixia Xu, Beijing (CN); Zhifeng Liu, Beijing (CN); Xiang Li, Beijing (CN); Mengmeng Liu, Beijing (CN); Hongyan Chu, Beijing (CN)

(73) Assignee: BEIJING UNIVERSITY OF TECHNOLOGY, Beijing (CN)

(*) Notice: Subject to any disclaimer, the term of this patent is extended or adjusted under 35 U.S.C. 154(b) by 0 days.

(21) Appl. No.: 17/515,307

(22) Filed: Oct. 29, 2021

(65) Prior Publication Data

US 2022/0050046 A1    Feb. 17, 2022

Related U.S. Application Data

(63) Continuation of application No. PCT/CN2020/123792, filed on Oct. 27, 2020.

(30) Foreign Application Priority Data

May 14, 2020 (CN) .......................... 202010405656.7

(51) Int. Cl.
*G01N 19/02* (2006.01)
(52) U.S. Cl.
CPC .................................... *G01N 19/02* (2013.01)
(58) Field of Classification Search
CPC .............................. G01N 19/00; G01N 19/02
See application file for complete search history.

(56) References Cited

U.S. PATENT DOCUMENTS 3,205,698 A * 9/1965 Shaw .................... G01L 3/1407
73/9
4,235,093 A * 11/1980 Spall ..................... G01M 13/04
73/9

(Continued)

FOREIGN PATENT DOCUMENTS

CN          102539264 A      7/2012
CN          102944512 A      2/2013

(Continued)

OTHER PUBLICATIONS

Scott Hejny, "Design of a Harmonic Drive Test Apparatus for Data Acquisition and Control", Rice University, Apr. 1997. (Year: 1997).*

(Continued)

*Primary Examiner* — David A. Rogers
(74) *Attorney, Agent, or Firm* — J.C. Patents

(57) ABSTRACT

The invention disclosed a friction coefficient measuring device under the condition of material periodic deformation. The measuring device is mainly composed of a torque sensor, a sleeve system, an upper sample, a lower sample, a flexible fixture, an air bearing, a clamping system, a tension-compression sensor, a support rod, and a support table. A working module of a friction-wear testing machine is connected with the torque sensor and then connected with the sleeve system to fix the upper sample. A rotating module of the friction-wear testing machine is used for connecting the flexible fixture to fix the lower sample. The tension-compression sensor can accurately measure the radial force between the upper sample and the lower sample. The torque sensor can measure the load torque values of the upper sample and lower sample during testing. According to the curve of the load torque value and radial load value change between the upper sample and lower sample, the friction (Continued)

coefficient between the flexible bearing and flexible gear is obtained.

2 Claims, 3 Drawing Sheets

(56) References Cited

U.S. PATENT DOCUMENTS

| | | | | |
|---|---|---|---|---|
| 5,031,443 | A * | 7/1991 | Black | G01N 19/02 73/9 |
| 5,113,688 | A * | 5/1992 | Lazeration | G01N 19/02 73/146 |
| 5,795,990 | A * | 8/1998 | Gitis | G01N 3/56 73/10 |
| 5,814,718 | A * | 9/1998 | Andresen | G01N 19/02 73/9 |
| 6,167,745 | B1 * | 1/2001 | Hamer | G01N 19/02 73/9 |
| 6,363,798 | B1 * | 4/2002 | Gitis | G01L 1/2243 73/862.381 |
| 6,418,776 | B1 * | 7/2002 | Gitis | G01N 3/56 73/10 |
| 7,373,800 | B2 * | 5/2008 | Domeier | G01N 3/56 73/10 |
| 7,784,326 | B2 * | 8/2010 | Domeier | G01N 11/10 73/9 |
| 9,500,234 | B2 * | 11/2016 | Kobayashi | F16D 1/076 |
| 10,088,386 | B2 * | 10/2018 | Liu | G01M 13/021 |
| 2020/0292305 | A1 * | 9/2020 | Wagaj | G01B 11/005 |
| 2022/0065746 | A1 * | 3/2022 | Yang | F16H 49/00 |

FOREIGN PATENT DOCUMENTS

| | | | | |
|---|---|---|---|---|
| CN | 104655511 | A | | 5/2015 |
| CN | 206387678 | U | | 8/2017 |
| CN | 107741397 | A | * | 2/2018 |
| CN | 106018264 | B | * | 8/2018 |
| CN | 105424524 | B | * | 7/2019 |
| CN | 110146441 | A | * | 8/2019 |
| CN | 21021494 | U | | 3/2020 |
| CN | 110927055 | A | | 3/2020 |
| DE | 202020100572 | U1 | * | 2/2020 ............ G01N 19/02 |
| GB | 2162953 | A | * | 2/1986 ............ G01N 19/02 |
| RU | 2455631 | C1 | | 7/2017 |

OTHER PUBLICATIONS

Shimeng Li et al., "New Approach for Modeling and Testing of Harmonic Drive in Robotic Systems", Proceedings of 2014 IEEE International Conference on Mechatronics and Automation, Aug. 3-6, 2014. (Year: 2014).*

Matthias Schulke et al., "Performance and Life of Harmonic Drive Gears for Space Applications", Procreedinghs of the 18th European Space Mechanisms and Tribology Symposium, Sep. 18-20, 2019. (Year: 2019).*

H. D. Taghirad et al., "An Experimental Study on Modelling and Identificaiotn of Harmonic Drive Systems", McGill University, 1996. (Year: 1996).*

Yuansong Zheng et al., "The Automatic Measurement System for Harmonic-drive Devices", The 4th International Conference on Design and Manufacturing Engineering, 2019. (Year: 2019).*

International Search Report of PCT/CN2020/123792.

* cited by examiner

DEVICE FOR MEASURING FRICTION COEFFICIENT UNDER THE CONDITION OF MATERIAL PERIODIC DEFORMATION

CROSS-REFERENCE TO RELATED APPLICATIONS

This application is a continuation of International Application No. PCT/CN2020/123792, filed on Oct. 27, 2020, which claims priority to Chinese Patent Application No. 202010405656.7, filed on May 14, 2020. The contents of the above applications are hereby incorporated by reference in their entireties and form a part of this specification.

TECHNICAL FIELD

The invention relates to the field of friction coefficient measurement, especially relates to a friction coefficient measuring device under the condition of material periodic deformation.

BACKGROUND ART

Harmonic reducers are widely used in aerospace, robotics, shipbuilding and other industries. The main failure mode is decrease of transmission accuracy, and wear is one of the main failure inducing factors.

When working, the lower sample in harmonic reducer is in a state of continuous periodic deformation under heavy alternating load.

It is difficult to realize the deformation behavior of the material during the friction process by the friction and wear tester, that is, it is difficult to obtain the friction and wear state between the flexspline and the flexible bearing. Therefore, it is necessary to design a friction coefficient measuring device under the condition of material periodic deformation.

The invention discloses a friction coefficient measuring device under the condition of material periodic deformation, which can realize the measurement of the friction coefficient of a lower sample material that is periodically deformed. The coefficient of friction of the periodically deformed material is obtained by the radial load value and the torque between the upper sample and the lower sample.

SUMMARY

The purpose of the present invention is to provide a friction coefficient measuring device under the condition of material periodic deformation, so as to facilitate the friction coefficient test of the periodically deformed materials.

In order to achieve the above objectives, the present invention adopts the following technical solutions:

The measuring device is mainly composed of a torque sensor 1, a sleeve system 2, an upper sample 3, a lower sample 4, a flexible fixture 5, an air bearing 6, a clamping system 7, a tension-compression sensor 8, a support rod 9, and a support table 10.

The torque sensor 1 is connected to the upper working module of the friction and wear tester, and torque of the upper sample 3 and lower sample 4 can be measured when the upper sample 3 and lower sample 4 are moving; the sleeve system 2 is connected to the torque sensor by bolts; the upper sample is fixed on the sleeve system 2 by bolts; the flexible fixture 5 is connected to the rotating module of the friction and wear tester by bolts to fix the lower sample; tension-compression sensor 8 is fixed on outside of the lower sample through the support rod and the support table for measuring the radial force between the lower sample 4 and upper sample 3. According to the curve of the load torque value and radial load value change between the upper sample 3 and lower sample 4, the friction coefficient between the upper sample 3 and lower sample 4 can be obtained. The slope of the curve multiplied by the long diameter value of the upper sample is the friction coefficient between the upper sample 3 and the lower sample 4.

The torque sensor 1 is connected to a part of the working module of the friction and wear tester by bolts which is used to measure the load torque value received during relative rotation between the samples to be tested.

The sleeve system 2 is composed of a chassis and a sleeve. The chassis is fixed on the torque sensor 1 by bolts, and the extended sleeve is fixed on the sample 3 by bolts.

The ratio of the length of the upper sample 3 to the diameter of the lower sample 4 is same as the ratio of the diameter of the flexible bearing to the diameter of the flexspline in the actual harmonic reducer, the length of the upper sample and diameter of the lower sample can be changed according to the size of different harmonic reducer. The length of the upper sample 3 are larger than the diameter of the lower sample 4, so when the upper sample 3 is matched with the lower sample 4, a pre-tightening force will be generated, which is measured by the tension-compression sensor 8 in real time.

The flexible fixture 5 is composed of a shell 5.1, an outer lining chassis 5.3, an inner lining chassis 5.2, an outer lining 5.3.1, 5.3.2, 5.3.3, and an inner lining 5.2.1, 5.2.2, 5.2.3. A four-point wrench is used to drive the three outer lining bevel gears 5.3.1.1, 5.3.1.2, and 5.3.1.3 to rotate on the outer lining chassis 5.3, and the track on outer lining chassis 5.3 drives the three outer lining to move in the slot of the flexible fixture. The inner lining is set in a similar way. There are three sets of inner lining bevel gears 5.2.1.1, 5.2.1.2, and 5.2.1.3 to be arranged along the circumference of the shell 5.1. When the inner lining bevel gears are adjusted using a four-point wrench, the inner lining bevel gears drive the inner layer chassis 5.2 to rotate, and drive the inner lining 5.2.1 to tighten inwardly or loosen outwardly along the slot of the shell 5.1 through the teeth on upper surface of the inner layer chassis 5.2. Fixing the lower sample 4 between the inner lining and outer lining of the flexible fixture 5 to prevent the lower sample from periodically deforming which causing the bottom deformation of the lower sample 4 when the device is running. This bottom deformation will affect the coaxiality between the upper sample 3 and the lower sample 4.

The air bearing 6 is arranged at a contact position when the lower sample is deformed. When the upper sample 3 enters the lower sample 4 and deforms, the lower sample can contact the air bearing 6.

In this way, the mobility of the air bearing 6 can be utilized to realize the degree of freedom of rotation of the lower sample 4. The air bearing is fixed on the clamping system 7. The clamping system 7 and tension-compression sensor 8 are connected together by internal threads. The other side of the tension-compression sensor is connected to the support rod 9 through an internal thread, support rod 9 and the support table 10 are connected together by a nut. Ensure that the tension-compression sensor 8 can be fixed in position.

Further, the measurement method includes the following steps:

Connect the torque sensor 1 to the upper working module of the friction and wear tester with bolts.

Connect the sleeve system 2 to the torque sensor 1 by bolts.

Fix the upper sample 3 on the sleeve system 2 by bolts.

The flexible fixture 5 is fixed on the rotating table of the friction and wear tester by bolts.

The lower sample 4 is fixed between the inner and outer linings of the flexible fixture 5.

The support rod 9 is connected to the support platform 10 with a nut.

The tension-compression sensor 8 is fixed on the support rod 9 through internal threads.

Fix the air bearing 6 on the clamping system 7 with bolts.

The clamping system 7 is connected to the tension-compression sensor 8 through internal threads.

After all components and test pieces are fixed, start the friction and wear tester, move the upper working module to move sleeve system 2 and the upper sample 3 which connects with the torque sensor 1 downwards until it is inserted into the lower sample 4. At this time, the upper sample 3 supports and deforms the lower sample 4, and the outside of the lower sample 4 is in contact with the air bearing 6.

Operate the rotating table, the load torque value and the radial load value between the upper sample 3 and the lower sample 4 are measured by tension-compression sensor 8 and torque sensor 1 in real time.

According to the curve of the load torque value and radial load value change between the upper sample 3 and lower sample 4, the friction coefficient between the upper sample 3 and lower sample 4 can be obtained. The slope of the curve multiplied by the long diameter value of the upper sample is the friction coefficient between the upper sample 3 and the lower sample 4.

The beneficial effects of the present invention are:

The measuring device disclosed by the invention has simple structure and convenient operation, and can accurately measure the friction coefficient between the sample and the flexible bearing under the condition of deformation. The size of the upper and lower samples can be adjusted according to the size of the flexspline and flexible bearing of different specifications of harmonic reducer to realize the friction coefficient test between the flexspline of different types of harmonic reducer and the flexible bearing material. The lower sample fixture can ensure that the lower sample is prevented from qualitative deformation when it is deformed, and the centering mechanism of the friction and wear tester can ensure the coaxiality of the upper and lower samples.

It can accurately measure the radial force between the upper sample and the lower sample.

The specific implementation

Figure 1:
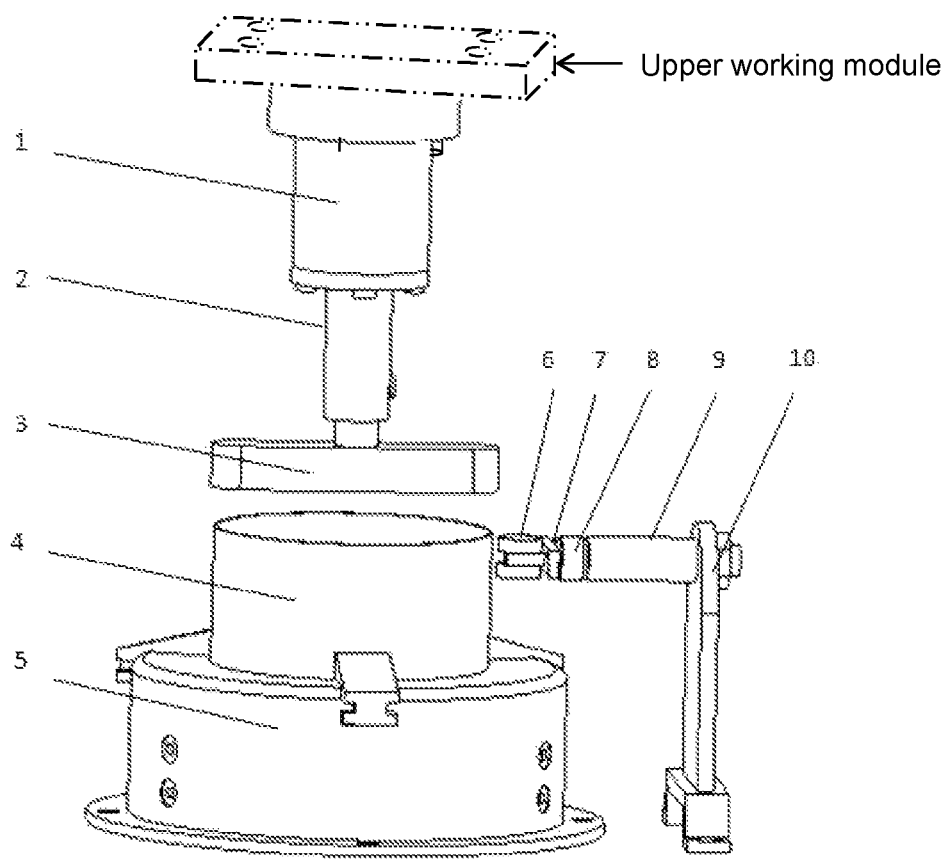
FIG. 1 is the general assembly drawing
Figure 2:
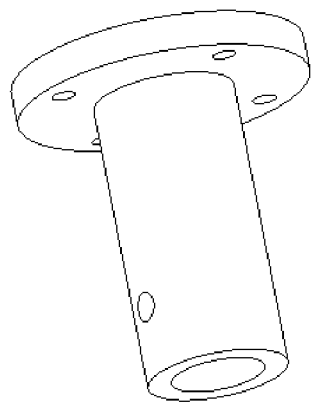
FIG. 2 is the sleeve system
Figure 3:
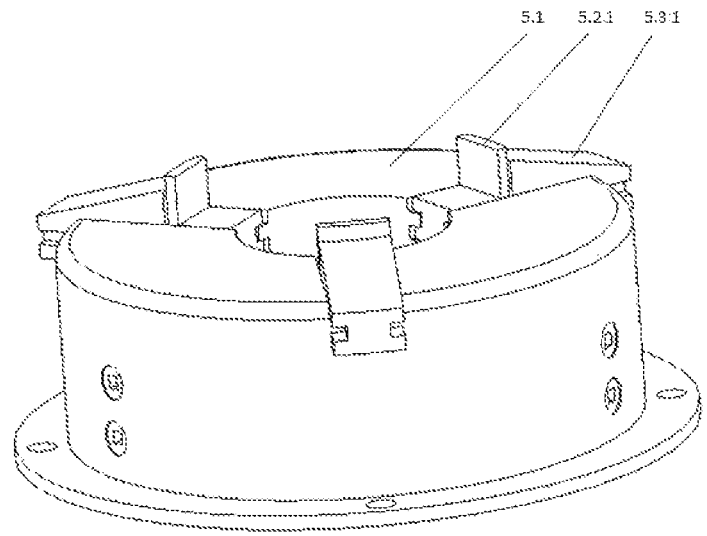
FIG. 3 shows the flexible fixture
Figure 4:
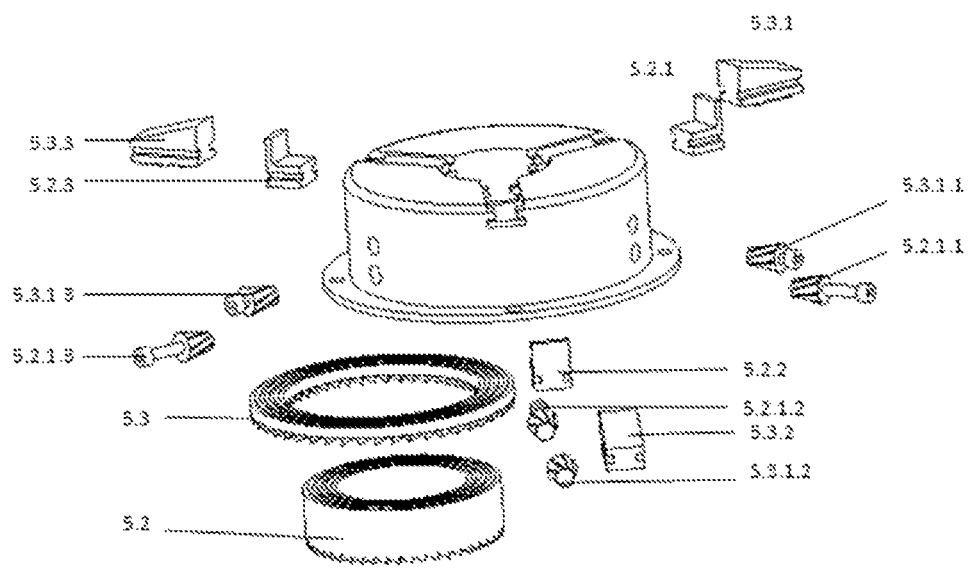
FIG. 4 is an exploded view of the flexible fixture
Figure 5:
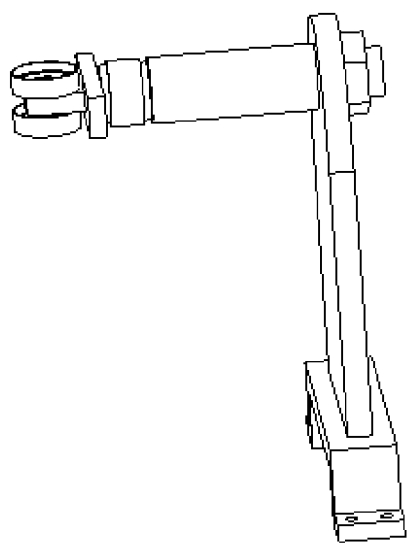
FIG. 5 shows the force measuring device.

The invention uses the lower sample of the SHF25-80 type harmonic reducer as a prototype to illustrate the present invention, but the present invention is not limited to this.

The steps to use the device in the test are as follows:

Step 1: Connect the torque sensor 1 to the upper working module of the friction and wear tester.

Step 2: Connect the sleeve system 2 to the torque sensor 1 through bolts.

Step 3: Fix the upper sample 3 on the sleeve system 2 by bolts.

Step 4: Fix the flexible fixture 5 on the rotating table of the friction and wear tester by bolts.

Step 5: Fix the lower sample 4 between the inner and outer linings of the flexible fixture 5.

Step 6: Connect the support rod 9 to the support platform 10 with nuts.

Step 7: Fix the tension-compression sensor 8 on the support rod 9.

Step 8: Fix the air bearing 6 on the clamping system 7.

Step 9: Connect the clamping system 7 to the tension-compression sensor 8.

Step 10: Apply a layer of grease evenly on the inner wall of the lower sample material.

Step 11: start the friction and wear tester to move the upper working module, to move the sleeve system 2 and the upper sample 3 which connects to the torque sensor 1 downwards until it is inserted into the lower sample 4.

Step 12: Rotate the rotary table to obtain the radial load value and torque between the upper sample and the lower sample. According to the curve of the load torque value and radial load value change between the upper sample 3 and lower sample 4, the friction coefficient between the upper sample 3 and lower sample 4 can be obtained.

Step 13: After the experiment is over, move the upper sample up and out of the lower sample material.

Step 14: replace the sample and repeat the above steps if continuous test is need.

In summary, the testing device and testing method of the present invention can simply and effectively measure the required data, and can ensure the accuracy of the data.

We claim:

1. A device for measuring friction coefficient under the condition of material periodic deformation, comprising: a torque sensor (1) is connected to an upper working module of a friction and wear tester to measure a moving torque between an upper sample (3) and a lower sample (4); a sleeve system (2) is connected to the torque sensor (1), and the upper sample is fixed on the sleeve system (2); a flexible fixture (5) is fixed on a friction and wear rotating module to fix the lower sample (4); a tension-compression sensor (8) is fixed on outside of the lower sample through a support rod and a support table to measure a radial force between the lower sample (4) and the upper sample (3); according to a curve of load torque value and radial load value change between the upper sample (3) and the lower sample (4), a friction coefficient between the upper sample (3) and the lower sample (4) is obtained by multiplying a slope of the curve by a long diameter value of the upper sample (3).

2. A device for measuring friction coefficient under the condition of material periodic deformation according to claim 1, wherein a radial load between the upper sample and the lower sample is measured by a tension-compression sensor.

* * * * *